(12) United States Patent
Serwy (10) Patent No.: US 11,790,931 B2
(45) Date of Patent: Oct. 17, 2023

(54) VOICE ACTIVITY DETECTION USING ZERO CROSSING DETECTION

(71) Applicant: Ambiq Micro, Inc., Austin, TX (US)

(72) Inventor: Roger David Serwy, Austin, TX (US)

(73) Assignee: Ambiq Micro, Inc., Austin, TX (US)

( * ) Notice: Subject to any disclaimer, the term of this patent is extended or adjusted under 35 U.S.C. 154(b) by 0 days.

(21) Appl. No.: 17/081,378

(22) Filed: Oct. 27, 2020

(65) Prior Publication Data

US 2022/0130410 A1    Apr. 28, 2022

(51) Int. Cl.
  *G10L 25/09*    (2013.01)
  *G10L 15/10*    (2006.01)
  *G10L 15/02*    (2006.01)

(52) U.S. Cl.
  CPC .............. *G10L 25/09* (2013.01); *G10L 15/02* (2013.01); *G10L 15/10* (2013.01)

(58) Field of Classification Search
  CPC .......... G10L 25/09; G10L 15/02; G10L 15/10
  See application file for complete search history.

(56) References Cited

U.S. PATENT DOCUMENTS

| | | | | |
|---|---|---|---|---|
| 3,940,565 A * | 2/1976 | Lindenberg | ............. | G10L 25/00 704/253 |
| 4,001,505 A * | 1/1977 | Araseki | .................... | G10L 25/78 704/246 |
| 4,048,448 A * | 9/1977 | Canniff | .................... | H04Q 5/02 379/180 |
| 4,704,696 A * | 11/1987 | Reimer | ................... | G10L 15/00 704/231 |
| 5,668,780 A * | 9/1997 | Hsieh | ...................... | G10L 17/26 367/198 |
| 5,732,392 A * | 3/1998 | Mizuno | .................. | G10L 25/78 704/226 |
| 6,240,386 B1 | 5/2001 | Thyssen | | |
| 6,765,931 B1 * | 7/2004 | Rabenko | .................. | H04B 3/23 348/E7.049 |
| 2002/0038211 A1 | 3/2002 | Rajan | | |
| 2002/0039425 A1 | 4/2002 | Burnett | | |
| 2006/0198538 A1 | 9/2006 | Malvar | | |
| 2006/0224382 A1 | 10/2006 | Taneda | | |

(Continued)

FOREIGN PATENT DOCUMENTS

CN            111951834 A  *  11/2020

*Primary Examiner* — Paras D Shah
*Assistant Examiner* — Edward Tracy, Jr.
(74) *Attorney, Agent, or Firm* — David R. Stevens; Stevens Law Group (57) ABSTRACT

A first VAD system outputs a pulse stream for zero crossings in an audio signal. The pulse density of the pulse stream is evaluated to identify speech. The audio signal may have noise added to it before evaluating zero crossings. A second VAD system rectifies each audio signal sample and processes each rectified sample by updating a first statistic and evaluating the rectified sample per a first threshold condition that is a function of the first statistic. Rectified samples meeting the first threshold condition may be used to update a second statistic and the rectified sample evaluated per a second threshold condition that is a function of the second statistic. Rectified samples meeting the second threshold condition may be used to update a third statistic. The audio signal sample may be selected as speech if the second statistic is less than a downscaled third statistic.

15 Claims, 6 Drawing Sheets

(56) References Cited

U.S. PATENT DOCUMENTS

| | | |
|---|---|---|
| 2011/0293103 A1 | 12/2011 | Park |
| 2014/0177887 A1* | 6/2014 | Roeck .................. H04R 25/505 381/316 |
| 2014/0278397 A1 | 9/2014 | Chen et al. |
| 2014/0348345 A1 | 11/2014 | Furst et al. |
| 2015/0243300 A1 | 8/2015 | Muesch |
| 2019/0297407 A1* | 9/2019 | Stanford-Jason ...... H04R 1/083 |
| 2019/0355383 A1 | 11/2019 | Mortensen et al. |

* cited by examiner

VOICE ACTIVITY DETECTION USING ZERO CROSSING DETECTION

RELATED APPLICATIONS

This application is related to U.S. application Ser. No. 17/081,640 filed Oct. 27, 2020, which is incorporated herein by reference for all purposes.

BACKGROUND

Background of the Invention

Smart speakers and other voice-controlled devices interpret human speech as instructions and implement actions accordingly. In many cases, a device will listen for a key word ("Alexa", "Ok Google," "OK Siri") and, when it is detected, the device will listen for a subsequent instruction. In order to implement this functionality, the device must always be listening for instructions, which requires a certain amount of power. One way to reduce power usage is to distinguish noise from human speech, known as voice activity detection (VAD). In this manner, evaluation of an audio signal to determine if the key word was spoken is performed only when human speech is detected.

It would be an advancement in the art to improve the implementation of VAD.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
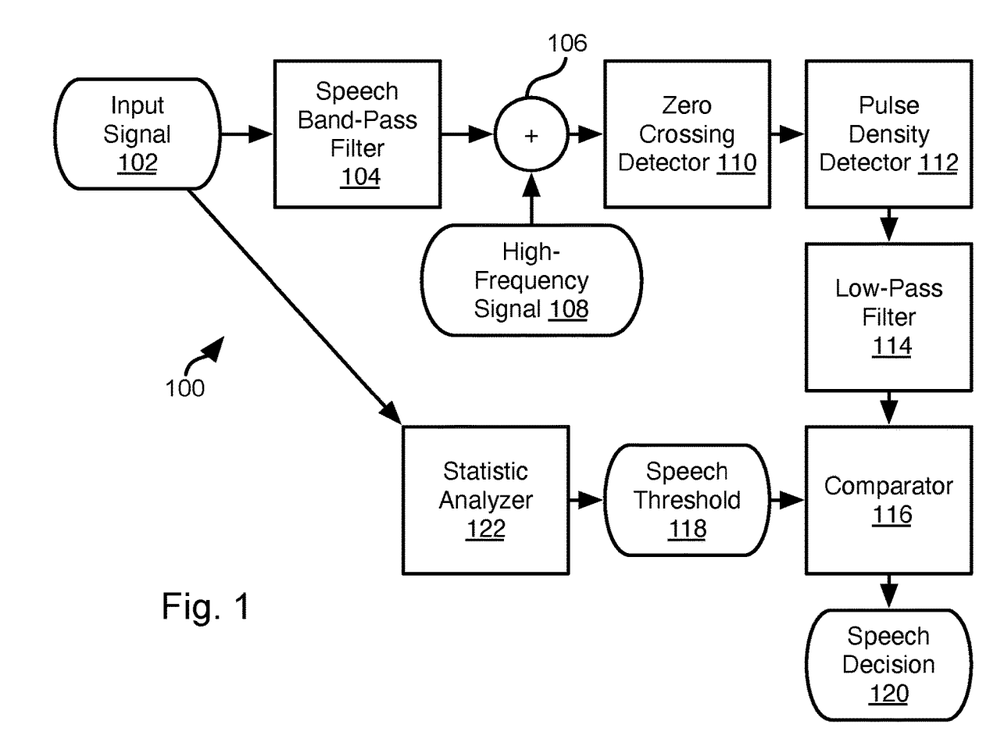
FIG. 1 is a schematic block diagram of components implementing VAD based on zero crossing detection in accordance with an embodiment of the present invention.

FIG. 1 illustrates a system 100 for performing voice activity detection (VAD) with respect to an input signal. The illustrated components of the system 100 may be embodied as executable code executed by a processor, distinct hardware components, or other implementation. The illustrated system 100 may be implemented as a first device used to wake up a second device in response to detection of speech in the input signal 102. For example, the second device may be a general purpose processor capable of performing speech-to-text processing, network communication, or other processing functions such as may be performed by a smart speaker or other voice-controlled device.

The input signal 102 may be received from a microphone and may be a raw digital audio signal sampled from the output of the microphone or may be the result of pre-processing the raw digital audio signal according to one or more pre-processing steps, such as low-pass filtering, scaling, downsampling, upsampling, or other pre-processing steps.

The system 100 may include an band-pass filter 104. The band-pass filter 104 may have a passband (e.g., 3 dB passband) corresponding to speech. For example, a passband of between 0.3 Hz and 20 kHz may be used. In other embodiments, a passband between 1 and 2 kHz may be used. The band-pass filter 104 may function to remove any DC component of the input signal 102 and remove noise that is unlikely to correspond to speech.

The band-pass filter 104 may output a first filtered signal that is input to a summer 106. The summer 106 may sum the first filtered signal with a high-frequency signal 108 to produce a summed signal. The high frequency signal 108 has a frequency and an amplitude. In some embodiments, the frequency is selected to ensure that a zero crossing occurs between each pair of contiguous samples in the high-frequency signal 108. Accordingly, the frequency may be equal to one half the sampling rate of the input signal 102.

The amplitude of the high frequency signal 108 may be calibrated to attributes of the detecting microphone that generated the input signal 102 and attributes of ambient noise expected to be encountered by the system 100. For example, an audio signal may be captured in an expected environment (e.g., recordings of audio in a real world environment) in the absence of speech. The amplitude may be raised until no speech is detected by the system 100 when the audio signal is processed by the system 100 as described below. The amplitude may be dynamic. For example, if feedback from a speech-to-text component indicates that a portion of the input signal determined to contain speech does not in fact contain speech, the amplitude may be increased to reduce false positives. As used throughout, a "portion" of a signal refers to a series of contiguous samples from the signal.

The summed signal may be input to a zero crossing detector 110. The output of the zero crossing detector 110 is a pulse stream. For example, for each zero crossing, the zero crossing detector 110 may output a first value, such as a binary one. If there is no sign change between a sample and a previous sample in the summed signal, the zero crossing detector 110 may output a second value, such as a binary zero. In some embodiments, only positive-to-negative crossings are detected as zero crossings. In others, only negative-to-positive crossings are detected as zero crossings. In still others, both positive-to-negative and negative-to positive crossings are detected as zero crossings.

The pulse stream may be input to a pulse density detector 112. The pulse density detector 112 produces a density stream such that for each sample in the pulse stream, the pulse density detector 112 outputs a sample in the density stream that corresponds to a number of pulses (first values) in a window of N pulses preceding the each sample in the pulse stream, where N is greater than 1, preferably greater than 10, and more preferably greater than 100.

The density stream may be input to a low-pass filter 114 that outputs a second filtered signal. The cutoff frequency (e.g., 3 dB cutoff frequency) may be selected to achieve a desired degree of smoothing or averaging of the second filtered signal relative to the density stream. In some implementations, the low-pass filter 114 functions as the pulse density detector, i.e. the result of low pass filtering is a signal that generally increases with increase in the pulse density and generally decreases with decrease in the pulse density, though the correspondence may be less than perfect. Accordingly, in such implementations, the pulse density detector 112 may be eliminated.

The second filtered signal may be input to a comparator 116 that evaluates the second filtered signal with respect to a speech threshold and outputs a speech decision 120 for each sample in the second filtered signal. The speech decision 120 may be a binary value such that for an input sample in the input signal 102 processed using the system 100, a corresponding speech decision 120 is output that indicates whether that input sample is likely to correspond to speech. The input samples of the input signal 102 identified as speech may be passed to a subsequent stage for confirmation that the samples in fact contain speech, performing speech-to-text synthesis, storage for subsequent use, or other purpose. Alternatively, samples in the first filtered signal corresponding in time (i.e., position in the series of samples) to the samples of the second filtered signal may be passed to a subsequent stage to take advantage of the filtering of the band-pass filter 104.

Those samples having values below the speech threshold 118 may be determined to correspond to speech. In particular, low frequency and high amplitude modulation due to speech may raise the amplitude of the summed signal above that of the high-frequency signal 108, resulting in a reduction in zero crossings and a corresponding reduction in pulse density.

The speech threshold 118 may be adjusted by a statistic analyzer 122. The statistic analyzer 122 receives the input signal 102 and/or the first filtered signal and generates statistical values characterizing one or both signals over time. These statistical values may include such values as a mean, standard deviation, maximum, minimum, root-mean-square (RMS), a percentile (e.g. $90^{th}$ percentile) value below which the absolute values of the input samples fall, or some other statistical values.

For example, the statistic analyzer may calculate the RMS value of a segment of samples in the input signal and scale the speech threshold 118 accordingly, e.g. increase the speech threshold 118 with increase in the RMS value and decrease the speech threshold 118 with decrease in the RMS value. In another example, the statistic analyzer 112 may calculate the RMS value of a segment of samples in the input signal and use the RMS value to scale the amplitude of the high-frequency signal 108, e.g. increase the amplitude of the high-frequency signal with increase in the RMS value and decrease the amplitude of the high-frequency signal with decrease in the RMS value. Either approach may enable the dynamic reduction of false positives in response to increase and decrease in the amplitude of ambient noise.

Figure 2:
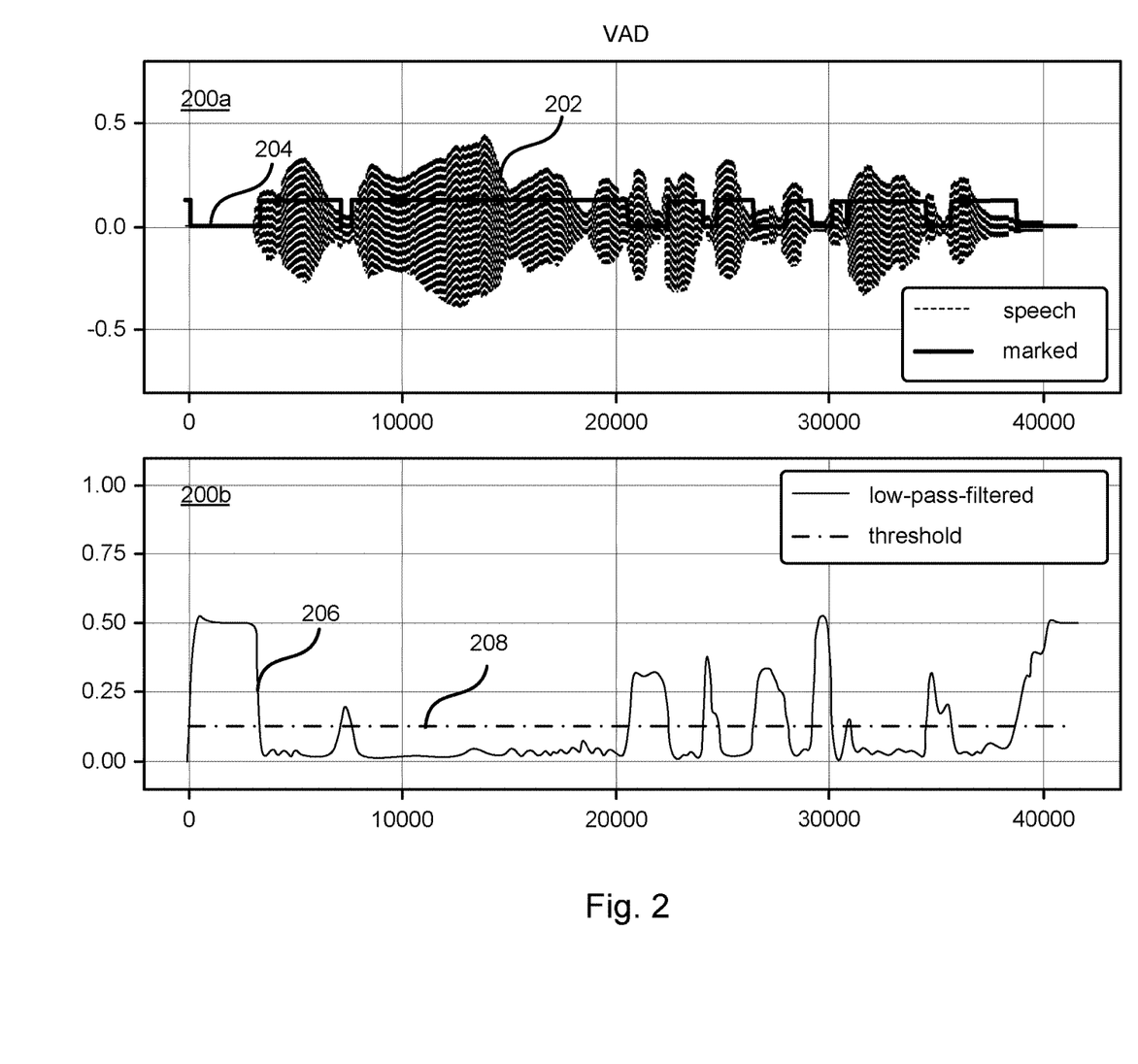
FIG. 2 includes plots of an audio signals and signals derived from the audio signal for performing VAD based on zero crossing detection in accordance with an embodiment of the present invention.

FIG. 2 illustrates plots of signals used and generated according to the system 100. The upper plot 200a includes a plot 202 of amplitude of a speech signal over a series of samples, such as a raw speech signal or filtered signal output by the speech band-pass filter 104. Plot 204 illustrates speech decisions 120 with respect to samples of the upper plot 200a, with the higher-valued portions indicating samples identified as speech and the lower-valued portions indicating non-speech. As is apparent, high-amplitude portions with an envelope corresponding to speech are correctly identified as speech whereas low amplitude noise is not.

Note that some portions identified as non-speech may correspond to certain portions of speech such as unvoiced friction such as /s/, /sh/, and /f/, which are difficult to distinguish from noise. However, such portions are of short duration and may be captured by expanding speech portions to include portions of a certain duration (e.g., less than 200 ms) between portions identified as speech or at the beginning and end of portions identified as speech.

The plot 200b shows a plot 206 of amplitude of the low-pass filtered signal over a series of samples, such as output from the low-pass filter 114. Plot 208 represents the threshold used by the comparator 116. In the illustrated example, those samples of the input signal 102 corresponding to samples of the low-pass filtered signal below the threshold would be identified as speech.

Figure 3:
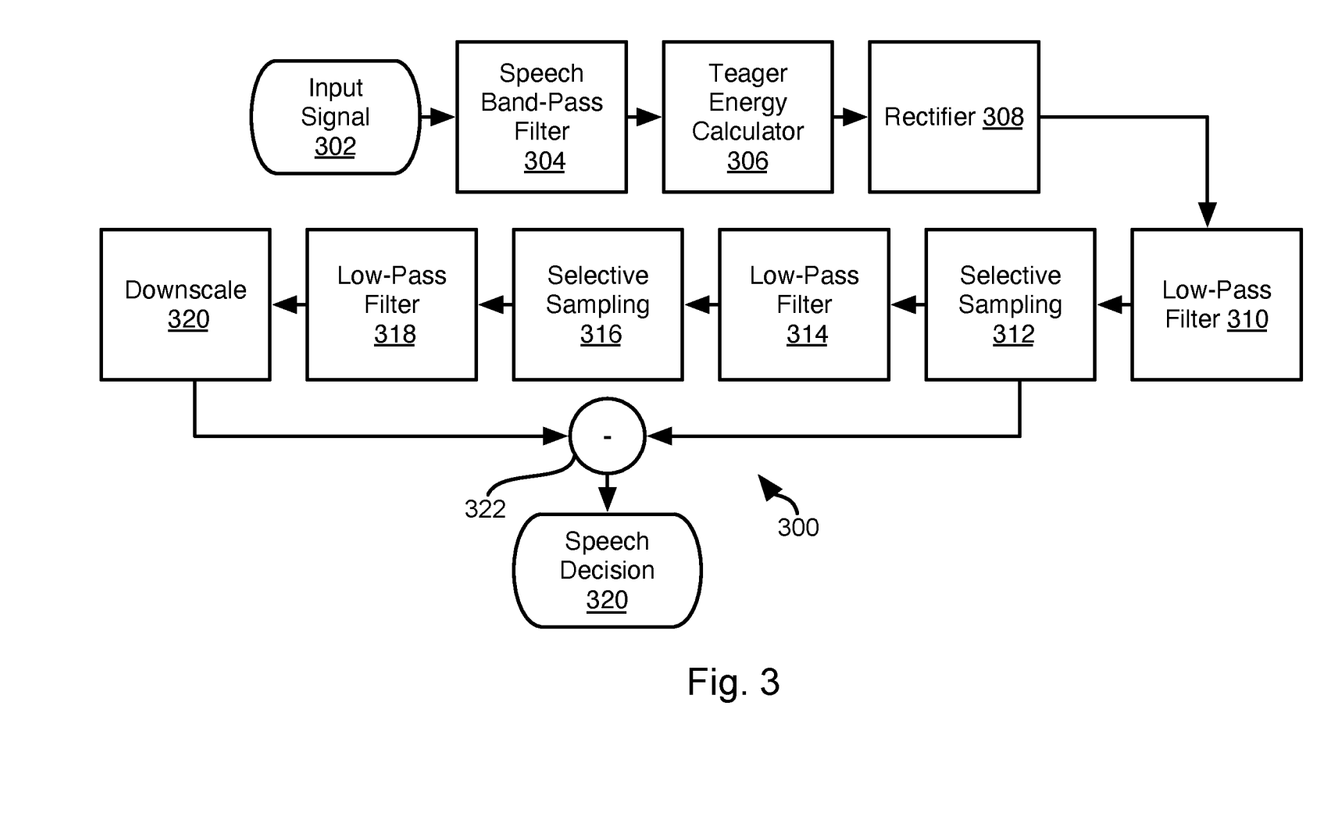
FIG. 3 is a schematic block diagram of components for performing VAD based on statistical properties of samples of an audio signal in accordance with an embodiment of the present invention.

FIG. 3 illustrates a system 300 implementing another approach for performing VAD. The system 300 is more sophisticated than the system 100 at the expense of more computational complexity. However, the system 300 is still very computationally efficient and may be implemented using only addition, multiplication, and subtraction operations with low storage requirements to store a state of the VAD algorithm between samples processed. Accordingly, the system 300 may be used to perform VAD used to trigger waking of a processing device capable of more complex operations than the system 300, e.g., a general purpose processor.

Figure 4:
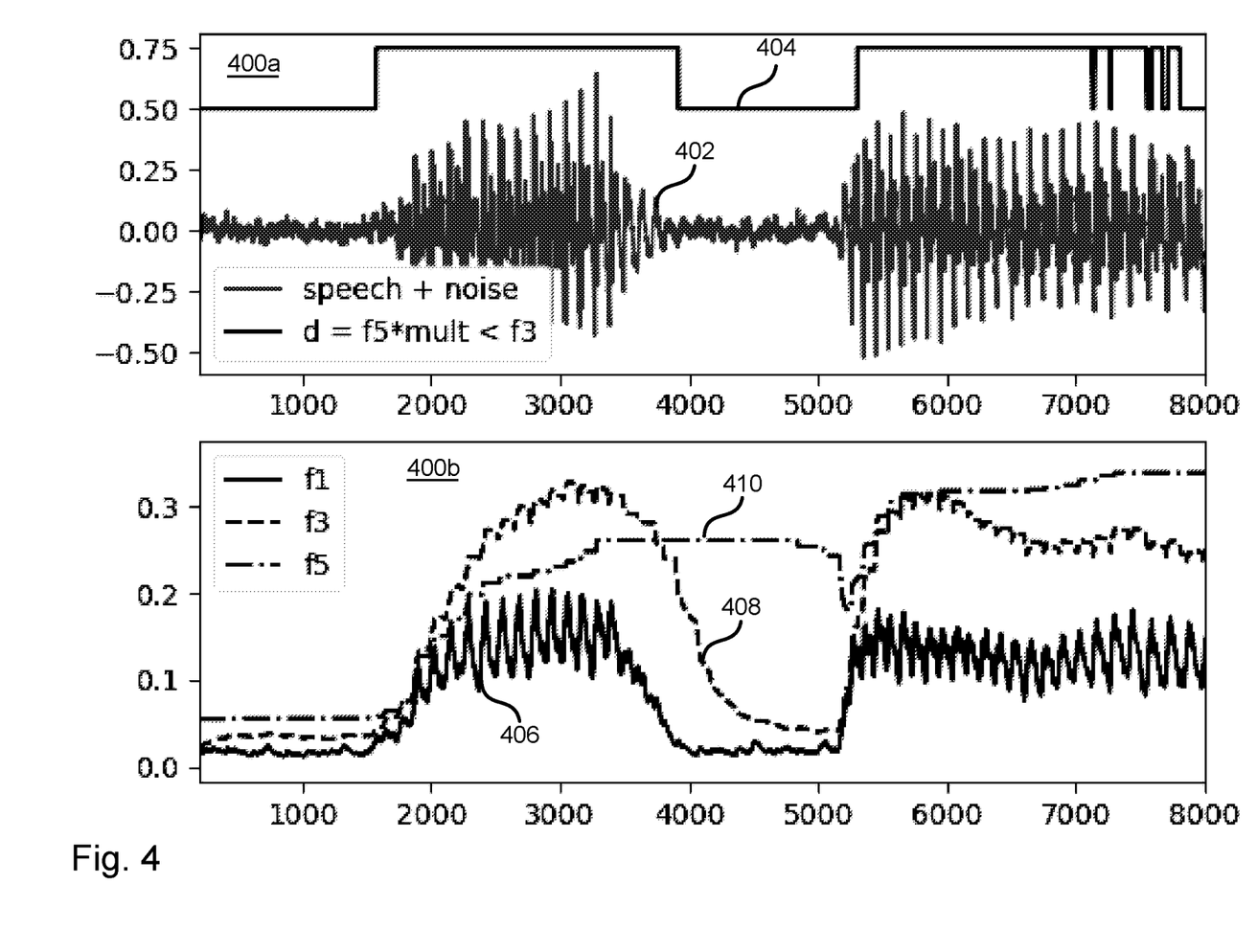
FIG. 4 includes plots of an audio signals and signals derived from the audio signal for performing VAD based on statistical properties of samples of an audio signal in accordance with an embodiment of the present invention.

In some embodiments, the approach of FIGS. 3 and 4 is implemented after performing VAD using the system 100, i.e. portions of a signal identified as speech using the system 100 may be processed using the system 300 to confirm that the signal in fact includes speech. The system 300 may be embodied as executable code executed by a processor, distinct hardware components, or other implementation. The system 100 and the system 300 may be implemented by separate executable code on a same hardware device or by separate hardware devices.

The system 300 may receive an input signal 302 that is either a raw audio signal or filtered version of an audio signal. The input signal 302 may be portions of an input signal 102 identified as speech by the system 100. Alternatively, portions of the signal resulting from band-pass filtering (output of bandpass filter 104) may be used as the input signal 302.

Where the input signal 302 is not already band-pass filtered, the input signal may be processed by a speech band-pass filter 304 to obtain a first filtered signal. The band-pass filter 304 may be configured as described above with respect to the band-pass filter 104.

The system 300 may further include a Teager energy calculator 306 that outputs Teager energy signal T of the signal input to the calculator 306 (the input signal 302 or first filtered signal). For example, for a given input signal s, the Teager energy T[n] for an individual sample s[n] of s may be calculated according to (1), where k is a time offset, such as a value from 1 to 5. The value of k may be a function of sampling rate and may be higher as the sampling rate is increased.

$$T[n]=(s[n]*s[n])-(s[n-k]*s[n+k]) \qquad (1)$$

The system 300 may include a rectifier stage 308 that outputs the absolute value of the signal input to it (input signal 302, first filtered signal, or T).

The system 300 may further include a first low-pass filtering stage 310. For example, for an input signal (output of rectifier 308) designated as x may be low-pass filtered to obtain a first low-pass signal. The first low-pass signal may be input to a selective sampling stage 312 that selects samples of x with references to the first low-pass signal. The selection stage 312 may select those samples whose amplitudes are statistically significant outliers relative to the first low-pass signal. The selection is based on characteristics of x and may therefore be non-uniform, i.e. at non-uniform intervals according to variation in the amplitude of x.

Those samples of x that are selectively sampled at stage 312 may be input to a second low-pass filtering stage 314 to obtain a second low-pass signal. The samples of x sampled at stage 312 may then be again selectively sampled at stage 316 resulting in a further reduction in samples. The selective sampling at stage 316 may select from the samples selected at stage 312 having amplitudes that are statistically significant outliers relative to the second low-pass signal.

The samples of x selected at stage 316 may be again low-pass filtered at stage 318 to obtain a third low-pass signal. This third low-pass signal may be further processed, such as by downscaling stage 320 to obtain a downscaled signal. In some implementations, this may include multiplying the third low-pass signal by a downscaling factor that is less than one. The function of the downscaling stage 320 may be to at least partially compensate for the fact that the third low-pass signal is obtained from higher-amplitude samples of x remaining after the selective sampling stages 312, 316. The downscaling factor may be selected experimentally for a given scenario, e.g., by reducing the downscaling factor incrementally from 1 until a number of false positives achieves a desired value, e.g. 0.1 percent of samples.

A difference stage 322 may calculate a difference between the downscaled signal and the second low-pass signal to obtain a difference signal. For example, for a sample in the downscaled signal, a sample in the first low-pass signal with the same index, or same position in the series of samples of the second low-pass signal, may be identified and subtracted from that sample of the downscaled signal.

The samples in the difference signal may be interpreted to obtain a speech decision 324. In some implementations, the downscaling factor may be selected such that those difference values greater than zero are likely to be speech samples with an acceptable degree of confidence. As is apparent, this will occur when the second low pass signal is smaller than the downscaled signal. When a difference value is determined to correspond to speech, a sample of the input signal 302 having the same index may be determined to correspond to speech and may be passed on to another device or another stage of processing for performing speech-to-text analysis or other processing.

Various modifications of the system 300 may be performed. For example, a single low-pass filtering stage 310 and selective sampling stage 312 may be used followed by the low-pass filtering stage 318 and the low-pass filtering stage 314 and selective sampling stage 316 may be omitted. Alternatively, one or more sets of stages, each set including a low-pass filtering stage followed by a selective sampling stage may be interposed between selective sampling stage 316 and low-pass filter 318.

The difference stage 322 may take as inputs any of the signals from any of the preceding stages, such as the signals output from some or all of the low-pass filtering stages 310, 314, 318. The difference function may therefore be a function that may include scaling, addition, or subtraction of these signals in order to achieve a desired degree of accuracy for speech identification.

The system 300 may implement Algorithm 1 below. Algorithm 1 may be performed on each sample s[n] of the input signal 302 in order (n being an index from 0 to N−1, where N is the total number of samples). Although "s[n]" is used, it shall be understood that samples of a signal derived from s[n] may be used, such as a band-pass filtered version of the input signal 302 or Teager energy T[n] calculated as described above for the input signal 302 or a band-pass filtered version of the input signal 302. Algorithm 2 may be used as an alternative to Algorithm 1 in which decay is performed to account for periods of zero amplitude or non-speech.

Algorithm 1: VAD By Selective Sampling
with Reference to Low-pass Filtered Signals

```
x = Abs(s[n]); //absolute value of s[n]
f1 = alpha * f1 + (1-alpha) * x;
if (x > m * f1) {
    f3 = alpha * f3 + (1-alpha) * x;
}
if (x > m * f3) {
    f5 = alpha * f5 + (1-alpha) * x;
}
d = (f5 * mult) - f3;
if (d > 0) {
    speech = 1;
}
```

Algorithm 2: VAD By Selective Sampling with Reference
to Low-pass Filtered Signals with Decay of Filter Values

```
x = Abs(s[n]); //absolute value of s[n]
f1 = alpha * f1 + (1-alpha) * x;
if (x + offset3 > m * f1) {
    f3 = alpha * f3 + (1-alpha) * x;
} else {
    f3 = beta*f3
    f5 = beta*f5
}
if (x + offset5 > m * f3) {
    f5 = alpha * f5 + (1-alpha) * x;
}else {
    f5 = beta*f5
}
d = (f5 * mult) - f3;
if (d > 0) {
    speech = 1;
}
```

The calculations of f1, f3 and f5 implement low-pass filtering (stages 310, 314, 318, respectively). Alpha is a low-pass filter coefficient that may be a value between 0.98 and 0.9999. For example, a value of 0.99 has been found to be effective. The value of alpha used to calculate f1, f3, f5, or any other low-pass filtering step, may be the same or different values of alpha may be used for different low-pass filtering steps.

The "if" statements of Algorithm 1 and Algorithm 2 may correspond to the selective sampling stages 312, 316. The value of m may be selected according to a tuning process. In some implementations, m may be a value between 1.3 and 1.7. For example, a value of 1.5 has been found to be acceptable. The value of m used in the "if" statements may be the same or different values of m may be used for evaluating the low-pass filtered signals f1 and f3, or however many other low-pass filtered signals are calculated.

The multiplication by "mult" in Algorithm 1 and Algorithm 2 may implement the downscaling factor of the downscaling stage 320. Accordingly, mult may be a value less than one selected as described above with respect to the downscaling factor in order to achieve an acceptable number of false positives.

The calculation of d corresponds to the difference stage 322. Where d is greater than zero, the sample s[n] from which x is calculated may be deemed to correspond to speech according to Algorithm 1 and Algorithm 2. Note that the equation "d=(f5*mult)−f3" may be replaced with "d=(f3*mult)−f1" in embodiments where only one instance of filtering and selective sampling is performed. In a like manner, where more than two instances of filtering and selective sampling are performed, d may be calculated as "d=(fx*mult)−fy", where fx is a result of filtering in the last instance of filtering and fy is a result of filtering in a preceding instance of filtering, such as the penultimate instance.

The value of beta in Algorithm 2 may be a decay factor that is less than one, e.g. between 0.999 and 0.9999. The decay resulting from multiplying by beta may be very gradual and account for the possibility that for many samples, e.g. many hundreds or thousands, no speech may be detected. In the absence of a decay factor, there may be abrupt changes in f1, f3, and/or f5 that would result in unnecessary false positives. In Algorithm 1, the decay according to beta may be omitted and the potential for false positives is handled by a subsequent stage or simply accepted.

In some implementations, the occurrence of a series of zero-valued input samples may be handled by using offset3 and offset5 as shown in Algorithm 2. The values of offset3 and offset5 may be identical or different. The values of offset3 and offset5 may be on the order of the smallest value representable using the number of bits and format of x. For example, supposing x is a 12 bit unsigned integer (x is an absolute value and is therefore always positive), offset3 and offset5 may be equal to $2^{(-11)}$. Alternatively, offset3 and offset5 may be equal to some multiple (e.g., 2 to 10) of the smallest representable value. As is apparent in Algorithm 2, when there is a series of zero-valued samples, the low-pass filter value f1 will eventually also reach zero. The conditions of the "if" statements will still be met by adding offset3 or offset5 to the zero-valued x, thereby avoiding discontinuities and ensuring that f3 and f5 will also decay to zero in response to a series of zero-valued samples. The use of offset3 and offset 5 as shown in Algorithm 2 may be used in the place of decay using beta or may be used in combination with decay using beta. Likewise, decay using beta may be used without the use of offset3 and offset5 in the "if" statements.

As is apparent, Algorithm 1 and Algorithm 2 require only multiplication, addition, and subtraction operations. Values used across multiple iterations include only alpha, m, mult, f1, f3, and f5 (and beta where decay is implemented). Accordingly, the computation and storage requirements needed to implement Algorithm 1 are very low. Algorithm 1 therefore provides a low power and yet highly accurate approach for identifying potential speech.

FIG. 4 illustrates plots of various signals that may be present during implementation of the system 300. Graph 400a includes a plot 402 of signal including speech and periodic periods of noise. Plot 404 shows speech decisions with respect to samples of the signal represented by plot 402 (high values indicating speech, low values indicating non-speech).

Graph 400b illustrates plots of internal signals of the system 300. Including a plot 406 of f1, plot 408 of f3, and plot 410 of f5. As is apparent, each signal is smoothed relative to previously calculated signal (f3 smoother than f1, f5 smoother than f3). As is also apparent, periods of noise in the original signal (plot 402) that are not identified as speech (see plot 404) are lower than the f1, f3, and f5, which are additionally scaled up by m prior to comparison.

Figure 5:
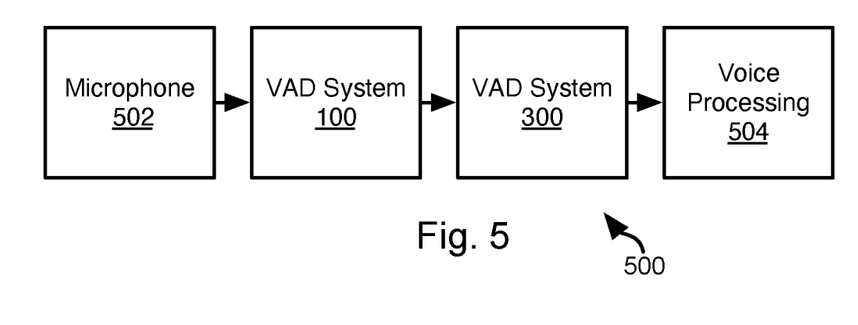
FIG. 5 is a schematic block diagram of a speech processing system in accordance with an embodiment of the present invention.

FIG. 5 is a schematic block diagram of a system 500 that may incorporate the VAD system 100 and the VAD system 300 as described above. The system 500 may include a microphone 502, which may be an individual microphone or array of microphones. The output of the microphone 502 may be preprocessed by low-pass filtering, band-pass filtering, or other type of processing in order to condition the output for subsequent processing.

The output of the microphone 502 may be input to the VAD system 100. The VAD system 100 identifies first portions of the output of the microphone that are likely to correspond to speech using the approach described above with respect to FIGS. 1 and 2. The first portions may be input to the VAD system 300. For example, the VAD system 100 may wake the VAD system 300 to process the first portions when the first portions area identified with the VAD system 300 otherwise being powered off or in a sleep mode using less power than when the VAD system 300 is awake. The VAD system 300 may process the first portions and identify second portions that are likely to correspond to speech using the approach described above with respect to the approach of FIGS. 3 and 4. It is to be expected that some portions identified as speech by VAD system 100 would not be identified as speech by VAD system 300.

The second portions identified by the VAD system 300 may be input to another voice processing system 504. The voice processing system 504 may perform any voice processing function known in the art, such as speech-to-text, voice authentication, or the like.

Each of the components 100, 300, 504 may be a separate hardware device, e.g., a separate semiconductor chip, separate circuit board, or a separate independently functioning computing device. Alternatively, any two or more of the components 100, 300, 504 may be different executable modules executing on the same hardware device.

Figure 6:
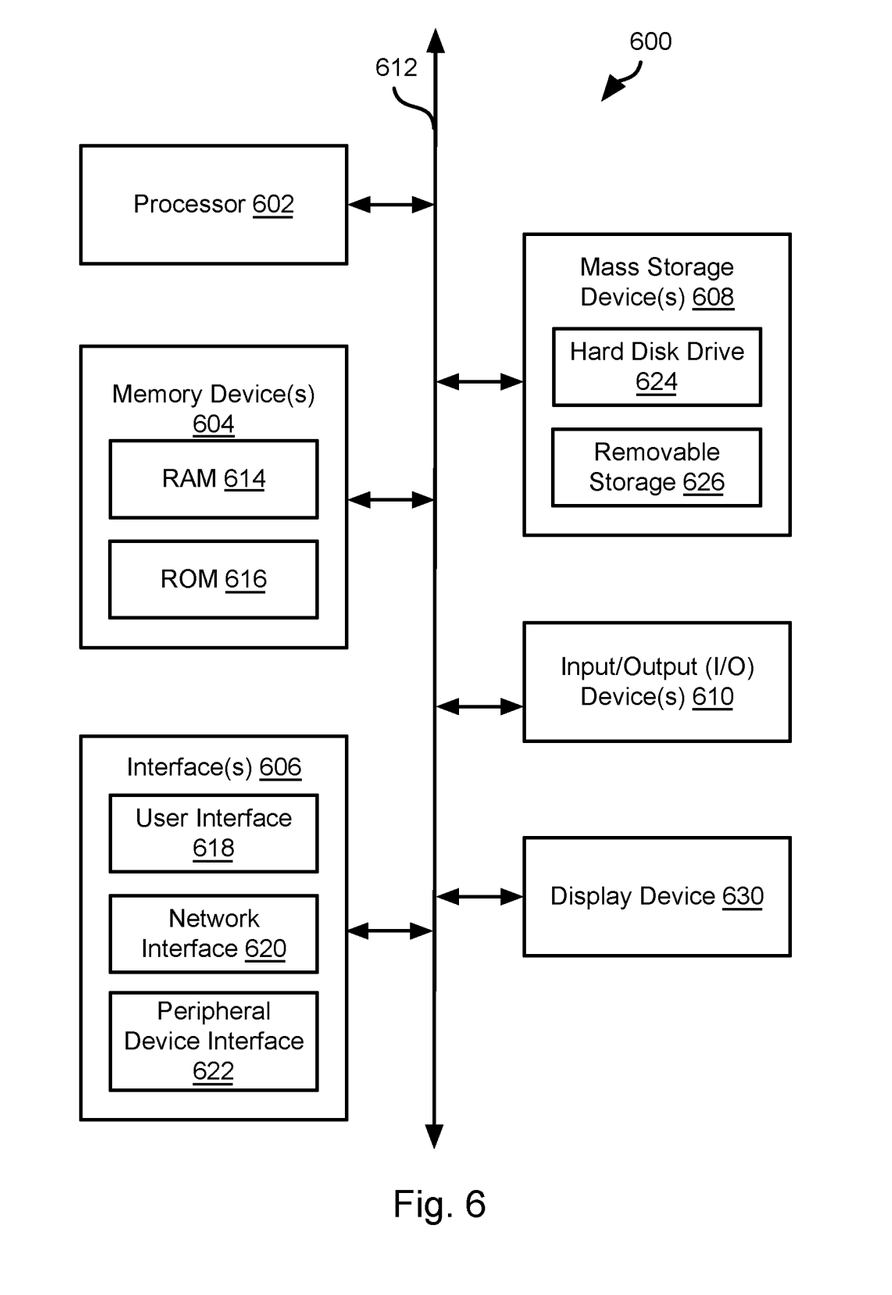
FIG. 6 is a schematic block diagram of an example computing device.

FIG. 6 is a block diagram illustrating an example computing device 600. Computing device 600 may be used to perform various procedures, such as those discussed herein.

Computing device 600 includes one or more processor(s) 602, one or more memory device(s) 604, one or more interface(s) 606, one or more mass storage device(s) 608, one or more input/output (I/O) device(s) 611, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more peripheral interfaces such as interfaces for printers, pointing devices (mice, track pad, etc.), keyboards, and the like.

Bus 612 allows processor(s) 602, memory device(s) 604, interface(s) 606, mass storage device(s) 608, I/O device(s) 610, and display device 630 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:
a processing device programmed to:
receive an original audio signal;
add a high-frequency signal to the original audio signal to obtain an audio signal, the high-frequency signal having a frequency and amplitude selected to add zero crossings to portions of the original audio signal including only ambient noise without speech;
generate a pulse stream according to zero crossings detected in the audio signal;
generate a pulse density stream according to the pulse stream indicating frequency of occurrence of pulses in the pulse stream over time;
evaluating the pulse density stream with respect to a threshold condition; and
identifying speech portions of the audio signal corresponding to portions of the pulse density stream meeting the threshold condition.

2. The apparatus of claim 1, wherein the processing device is programmed to identify the speech portions of the audio signal by identifying portions of the pulse density stream below a threshold value.

3. The apparatus of claim 1, wherein the processing device is further programmed to:
band-pass filter the original audio signal to obtain a filtered signal; and
add the high-frequency signal to the filtered signal to obtain the audio signal.

4. The apparatus of claim 3, wherein the high-frequency signal has a frequency equal to half a sampling frequency of the original audio signal.

5. The apparatus of claim 3, wherein the band-pass filter has a passband between 0.3 and 20 kHz.

6. The apparatus of claim 1, wherein the processing device is further programmed to generate the pulse density stream and evaluate the pulse density stream with respect to a threshold by:
low-pass filtering the pulse stream to obtain a filtered stream; and
identifying portions of the filtered stream having lower amplitude than the threshold condition.

7. The apparatus of claim 1, wherein the processing device is further programmed to adjust the threshold condition according to statistical values based on the audio signal.

8. The apparatus of claim 1, further comprising a microphone coupled to the processing device, the processing device programmed to derive the audio signal from an output of the microphone.

9. A method comprising:
receiving, by a processing device, an original audio signal;
adding, by the processing device, a high-frequency signal to the original audio signal to obtain an audio signal, the high-frequency signal having zero crossings between each pair of contiguous samples of the high-frequency signal;
generating, by the processing device, a pulse stream according to zero crossings detected in the audio signal;
generating, by the processing device, a pulse density stream according to the pulse stream indicating frequency of occurrence of pulses in the pulse stream over time;
evaluating, by the processing device, the pulse density stream with respect to a threshold condition; and
identifying, by the processing device, speech portions of the audio signal corresponding to portions of the pulse density stream meeting the threshold condition.

10. The method of claim 9, further comprising identifying the speech portions of the audio signal by identifying portions of the pulse density stream below a threshold value.

11. The method of claim 9, further comprising:
band-pass filtering the original audio signal with a band-pass filter to obtain a filtered signal; and
adding the high-frequency signal to the filtered signal to obtain the audio signal.

12. The method of claim 11, wherein the band-pass filter has a passband between 0.3 and 20 kHz.

13. The method of claim 9, wherein generating the pulse density stream and evaluating the pulse density stream with respect to the threshold condition comprises:
   low-pass filtering the pulse stream to obtain a filtered stream; and
   identifying portions of the filtered stream having lower amplitude than a threshold value.

14. The method of claim 9, further comprising adjusting the threshold condition according to statistical values based on the audio signal.

15. The method of claim 9, further comprising deriving the audio signal from an output of a microphone coupled to the processing device.

\* \* \* \* \*